United States Patent
Melander et al.

(10) Patent No.: US 9,935,894 B2
(45) Date of Patent: *Apr. 3, 2018

(54) COLLABORATIVE INTER-SERVICE SCHEDULING OF LOGICAL RESOURCES IN CLOUD PLATFORMS

(71) Applicant: Cisco Technology, Inc., San Jose, CA (US)

(72) Inventors: Bob Melander, Stockholm (SE); Hareesh Puthalath, Stockholm (SE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,016

(22) Filed: Sep. 15, 2016

(65) Prior Publication Data
US 2017/0005948 A1    Jan. 5, 2017

Related U.S. Application Data

(63) Continuation of application No. 14/273,385, filed on May 8, 2014, now Pat. No. 9,473,365.

(51) Int. Cl.
*H04L 12/911* (2013.01)
*H04L 12/24* (2006.01)
(Continued)

(52) U.S. Cl.
CPC .......... *H04L 47/781* (2013.01); *G06F 9/5044* (2013.01); *G06F 9/5055* (2013.01);
(Continued)

(58) Field of Classification Search
CPC ... H04L 47/781; H04L 67/10; H04L 41/5054; H04L 67/16; G06F 9/5055; G06F 9/5072
See application file for complete search history.

(56) References Cited

U.S. PATENT DOCUMENTS 6,108,782 A   8/2000  Fletcher et al.
6,343,290 B1  1/2002  Cossins et al.
(Continued)

FOREIGN PATENT DOCUMENTS

CN    101394360    7/2011
CN    102164091    8/2011
(Continued)

OTHER PUBLICATIONS

William, "Keep It Simple, Stupid: OpenStack nova-scheduler and its algorithm", May 12, 2012, 18 pages, http://williamherry.blogspot.com/2012/05/openstack-nova-scheduler-and-its.html.*

(Continued)

*Primary Examiner* — Brian J Gillis
*Assistant Examiner* — Amy Ling
(74) *Attorney, Agent, or Firm* — Polsinelli PC

(57) ABSTRACT

The subject disclosure relates to a method for scheduling logical resources in cloud platforms. A cloud platform system identifies resource candidates for hosting a logical resource of a cloud service. The system filters the resource candidates by running them through a filter chain, a collection of serially connected filters. The filter chain may contain one or more reference filters that reference other filter chains. When the resource candidates encounter one of the reference filters, the other filter chains can be triggered and processed. The system selects one or more resources for hosting the logical resource from the filtered resource candidates.

20 Claims, 13 Drawing Sheets

(51) Int. Cl.
*H04L 29/08* (2006.01)
*G06F 9/50* (2006.01)

(52) U.S. Cl.
CPC ........ *G06F 9/5072* (2013.01); *H04L 41/5054* (2013.01); *H04L 67/10* (2013.01); *H04L 67/16* (2013.01)

(56) References Cited

U.S. PATENT DOCUMENTS

| | | |
|---|---|---|
| 6,721,804 B1 | 4/2004 | Rubin et al. |
| 6,733,449 B1 | 5/2004 | Krishnamurthy et al. |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 9,015,324 B2 | 4/2015 | Jackson |
| 9,043,439 B2 | 5/2015 | Bicket et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0143928 A1 | 10/2002 | Maltz et al. |
| 2002/0174216 A1 | 11/2002 | Shorey et al. |
| 2003/0018591 A1 | 1/2003 | Komisky |
| 2003/0228585 A1 | 12/2003 | Inoko et al. |
| 2006/0126665 A1 | 6/2006 | Ward et al. |
| 2008/0201711 A1 | 8/2008 | Amir Husain |
| 2008/0235755 A1 | 9/2008 | Blaisdell et al. |
| 2009/0006527 A1* | 1/2009 | Gingell, Jr. ........... G06F 9/5072 709/202 |
| 2009/0019367 A1 | 1/2009 | Cavagnari et al. |
| 2009/0138763 A1 | 5/2009 | Arnold |
| 2009/0177775 A1* | 7/2009 | Radia .................. H04L 12/6418 709/226 |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0191783 A1 | 7/2010 | Mason et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0035754 A1 | 2/2011 | Srinivasan |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0173303 A1 | 7/2011 | Rider |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261828 A1 | 10/2011 | Smith |
| 2011/0276675 A1 | 11/2011 | Singh et al. |
| 2011/0276951 A1 | 11/2011 | Jain |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0290647 A1 | 11/2012 | Ellison et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |
| 2013/0097601 A1 | 4/2013 | Podvratnik et al. |
| 2013/0111540 A1 | 5/2013 | Sabin |
| 2013/0124712 A1 | 5/2013 | Parker |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0179941 A1 | 7/2013 | McGloin et al. |
| 2013/0182712 A1 | 7/2013 | Aguayo et al. |

(56) References Cited

U.S. PATENT DOCUMENTS

| | | | |
|---|---|---|---|
| 2013/0185433 A1 | 7/2013 | Zhu et al. | |
| 2013/0191106 A1 | 7/2013 | Kephart et al. | |
| 2013/0198374 A1 | 8/2013 | Zalmanovitch et al. | |
| 2013/0204849 A1 | 8/2013 | Chacko | |
| 2013/0232491 A1 | 9/2013 | Radhakrishnan et al. | |
| 2013/0246588 A1 | 9/2013 | Borowicz et al. | |
| 2013/0297769 A1 | 11/2013 | Chang et al. | |
| 2013/0318240 A1* | 11/2013 | Hebert | G06F 9/5038 709/226 |
| 2013/0318546 A1 | 11/2013 | Kothuri et al. | |
| 2013/0339949 A1 | 12/2013 | Spiers et al. | |
| 2014/0006481 A1 | 1/2014 | Frey et al. | |
| 2014/0006585 A1 | 1/2014 | Dunbar et al. | |
| 2014/0040473 A1 | 2/2014 | Ho et al. | |
| 2014/0040883 A1 | 2/2014 | Tompkins | |
| 2014/0075357 A1 | 3/2014 | Flores et al. | |
| 2014/0108985 A1 | 4/2014 | Scott et al. | |
| 2014/0156557 A1 | 6/2014 | Zeng et al. | |
| 2014/0164486 A1 | 6/2014 | Ravichandran et al. | |
| 2014/0189095 A1 | 7/2014 | Lindberg et al. | |
| 2014/0189125 A1 | 7/2014 | Amies et al. | |
| 2014/0222953 A1 | 8/2014 | Karve et al. | |
| 2014/0282536 A1 | 9/2014 | Dave et al. | |
| 2014/0282889 A1 | 9/2014 | Ishaya et al. | |
| 2014/0297569 A1 | 10/2014 | Clark et al. | |
| 2014/0317261 A1 | 10/2014 | Shatzkamer et al. | |
| 2014/0366155 A1 | 12/2014 | Chang et al. | |
| 2015/0043576 A1 | 2/2015 | Dixon et al. | |
| 2015/0052517 A1 | 2/2015 | Raghu et al. | |
| 2015/0058382 A1 | 2/2015 | St. Laurent et al. | |
| 2015/0058459 A1 | 2/2015 | Amendjian et al. | |
| 2015/0071285 A1 | 3/2015 | Kumar et al. | |
| 2015/0106802 A1 | 4/2015 | Ivanov et al. | |
| 2015/0106805 A1 | 4/2015 | Melander et al. | |
| 2015/0120914 A1 | 4/2015 | Wada et al. | |
| 2015/0242204 A1 | 8/2015 | Hassine et al. | |
| 2015/0281067 A1 | 10/2015 | Wu | |
| 2015/0281113 A1 | 10/2015 | Siciliano et al. | |
| 2015/0319063 A1 | 11/2015 | Zourzouvillys et al. | |
| 2015/0326524 A1 | 11/2015 | Tankala et al. | |
| 2015/0373108 A1 | 12/2015 | Fleming et al. | |
| 2016/0062786 A1 | 3/2016 | Meng et al. | |
| 2016/0099847 A1 | 4/2016 | Melander et al. | |
| 2016/0105393 A1 | 4/2016 | Thakkar et al. | |
| 2016/0127184 A1 | 5/2016 | Bursell | |
| 2016/0134557 A1 | 5/2016 | Steinder et al. | |
| 2016/0188527 A1 | 6/2016 | Cherian et al. | |
| 2016/0253078 A1 | 9/2016 | Ebtekar et al. | |
| 2016/0254968 A1 | 9/2016 | Ebtekar et al. | |
| 2016/0261564 A1 | 9/2016 | Foxhoven et al. | |
| 2017/0024260 A1 | 1/2017 | Chandrasekaran et al. | |
| 2017/0026470 A1 | 1/2017 | Bhargava et al. | |
| 2017/0041342 A1 | 2/2017 | Efremov et al. | |
| 2017/0054659 A1 | 2/2017 | Ergin et al. | |
| 2017/0097841 A1 | 4/2017 | Chang et al. | |
| 2017/0099188 A1 | 4/2017 | Chang et al. | |
| 2017/0104755 A1 | 4/2017 | Arregoces et al. | |
| 2017/0147297 A1 | 5/2017 | Krishnamurthy et al. | |
| 2017/0264663 A1 | 9/2017 | Bicket et al. | |
| 2017/0339070 A1 | 11/2017 | Chang et al. | |

FOREIGN PATENT DOCUMENTS

| | | |
|---|---|---|
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-00706 76 | 5/2015 |
| WO | WO 2009/155574 | 12/2009 |
| WO | WO 2010/030915 | 3/2010 |
| WO | WO 2013/158707 | 10/2013 |

OTHER PUBLICATIONS

Henry, "Keep It Simple, Stupid, OpenStack nova-scheduler and its algorithm", May 12, 2012, ibm.com, 18 Pages.*

Sun, et al., "IaaS Public Cloud Computing Platform Scheduling Model and Optimization Analysis", Int. J. Communications, Network and System Sciences, 2011, 4, 803-811, 9 Pages.*

Wikipedia; "Pipeline (Unix)", Wikipedia, May 4, 2014, https://en.wikipedia.org/w/index.php?title=Pipeline2/028Unix%29&oldid=606980114.

Wikipedia; "Filter (software)", Wikipedia, Feb. 8, 2014, https://en.wikipedia.org/w/index.php?title=Filter_%28software%29&oldid=594544359.

Beyer; Steffen, "Data::Locations", YAPC::Europe, London, UK, ICA, Sep. 24, 2000, https://web.archive.org/web/20050301000000*/http://guestengelschall.comhsb/perl/yapc/DataLocations/DataLocations.ppt.

International Preliminary Report on Patentability dated Nov. 17, 2016 for related PCT Application No. PCT/US2015/029055.

International Search Report and Written Opinion for the corresponding International Patent Application No. PCT/US2015/029055, dated Aug. 14, 2015, 11 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Herry, "Keep It Simple, Stupid: OpenStack nova-scheduler and its algorithm", May 12, 2012, IBM, 12 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

CSS Corp, "Enterprise Cloud Gateway (ECG)—Policy driven framework environments," original published on or about Feb. 11, 2012; 1 page; http://www.css-cloud.com/platform/enterprise-cloud-qateway.php.

Fang K., "LISP MAC-EID-TO-RLOC Mapping (LISP based L2VPN)," Network Working Group, Internet Draft, CISCO Systems, Jan. 2012, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

(56) References Cited

OTHER PUBLICATIONS

Juniper Networks, Inc., "Recreating Real Application Traffic in Junosphere Lab," Solution Brief, Dec. 2011, 3 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Naik, Vijay K., et al., "Harmony: A Desktop Grid for Delivering Enterprise Computations," Grid Computing, 2003, Fourth International Workshop on Proceedings, Nov. 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technolopy/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

\* cited by examiner 1  for each R in CC:{RC} do:
2      for each F in $C_{Start}$_X do:
3          if F is a $F_T$ then:
4              if R fails F:
5                  mark and remove R from CC:{RC};
6                  break;
7          else: /* F is a $F_R$ */
8              create copy CC' of CC, possibly with some information removed, in particular set CC':{RC} = {R};
9              update CC' with information so scheduler in other service can later properly return control to this scheduler;
10             let $F_R$ add filter-specific data to CC;
11             handover control to Ref(S_$S_Y$, $C_Y$_$X_j$, 1) and include CC';
12             [WAIT for control to return along with CC''']
13             let $F_R$ adapt and copy filter-specific data from CC''' to CC;
14             Adapt and copy generic information from C''' to CC, in particular {RC};
15     if R not marked then:
16         if calculate_weights == TRUE:
17             w[R] = weight_function(R);
18         else:
19             w[R] = 1;
20 winner = random_pick(R from CC:{RC} with largest same w[R]);

*FIG. 10A*

```
1    fetch chain C_Y_X_j;
2    update CC' with service specific data;
3    for each R in CC':{RC} do: /* Can be only 1 item */
4        for each F in C_Y_X_j starting from filter 1 do:
5            if F is a F_T then:
6                if R fails F, remove R from CC':{RC}, then break;
7            else: /* F is a F_R */
8                /* same as in FIG. 10A */
```

COLLABORATIVE INTER-SERVICE SCHEDULING OF LOGICAL RESOURCES IN CLOUD PLATFORMS

CROSS-REFERENCES TO RELATED APPLICATIONS

This application is a continuation of U.S. application Ser. No. 14/273,385, filed on May 8, 2014, the content of which is incorporated herein by reference.

BACKGROUND

1. Technical Field

The subject technology relates to a method for scheduling logical resources in cloud platforms. In particular, aspects of the technology provide systems and methods for utilizing a filter scheduler with multiple filter chains to enable joint, service-spanning scheduling among multiple infrastructure services.

2. Introduction

Through virtual machine technology, cloud computing is changing the landscape of network-based services by offering its customers (also known as "tenants") a means to use a service provider's virtualized computing assets, such as virtual processors, virtual storage, and virtual network resources, instead of having to purchase and own all of the necessary equipment outright. In particular, Infrastructure-as-a-Service (IaaS) cloud platforms may offer infrastructure services such as compute service(s), networking service(s), and storage service(s) to the tenants. They can provide logical resources that can be created on-demand by cloud users via, for instance, a representational state transfer (REST) application programming interface (API). Examples of such logical resources are virtual machine (VM), network, router, and block storage.

Under the cover, the logical resources can be implemented and materialized by the IaaS platform using servers, VMs, virtual/physical network devices, and storage devices. Each infrastructure service may include a resource management function and a scheduler function, whereby the logical resources can be mapped to the underlying physical resources that host them. To minimize cost, the IaaS providers may want the resource management and scheduling functions to make as efficient use of the underlying resources as possible. The cloud application utilizing the logical resources may also have specific performance requirements.

However, instantiating a logical resource may often require that the resource managers and the schedulers in multiple infrastructure services to work in concert. For example, in order for a VM to serve as a logical router, the VM may require information from both a network service and a compute service, each equipped with its own scheduler. If these schedulers execute their tasks independently of each other in a non-collaborative way, the utilization of the services may be poor or performance requirements may not be fulfilled.

Traditionally, one way to solve this problem is to use a common scheduler for multiple IaaS services. This solution, however, creates a tighter coupling among all of the involved IaaS services. Thus, having a central scheduler may increase inter-service control traffic and state sharing, resulting in higher inter-service dependencies. This may also complicate the evolution of the services as they are typically developed by separate development teams.

Another traditional method of resolving the problem is to use a hierarchy of schedulers. However, this approach is not without its complications. In order to perform scheduling in a sufficiently efficient manner, the scheduler that sits on top of the individual service schedulers may require fairly detailed service-specific knowledge of all the subordinate schedulers and services. Thus, the scheduler on top easily ends up merely performing a serialized invocation of the service-specific schedulers. In other words, the top-level scheduler can be relegated to performing more of an orchestration task rather than a true joint, service-spanning scheduling.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIGS. 10A-10B illustrate example pseudocode for scheduling a service; and

DETAILED DESCRIPTION OF EXAMPLE EMBODIMENTS

1. Overview

Figure 1:
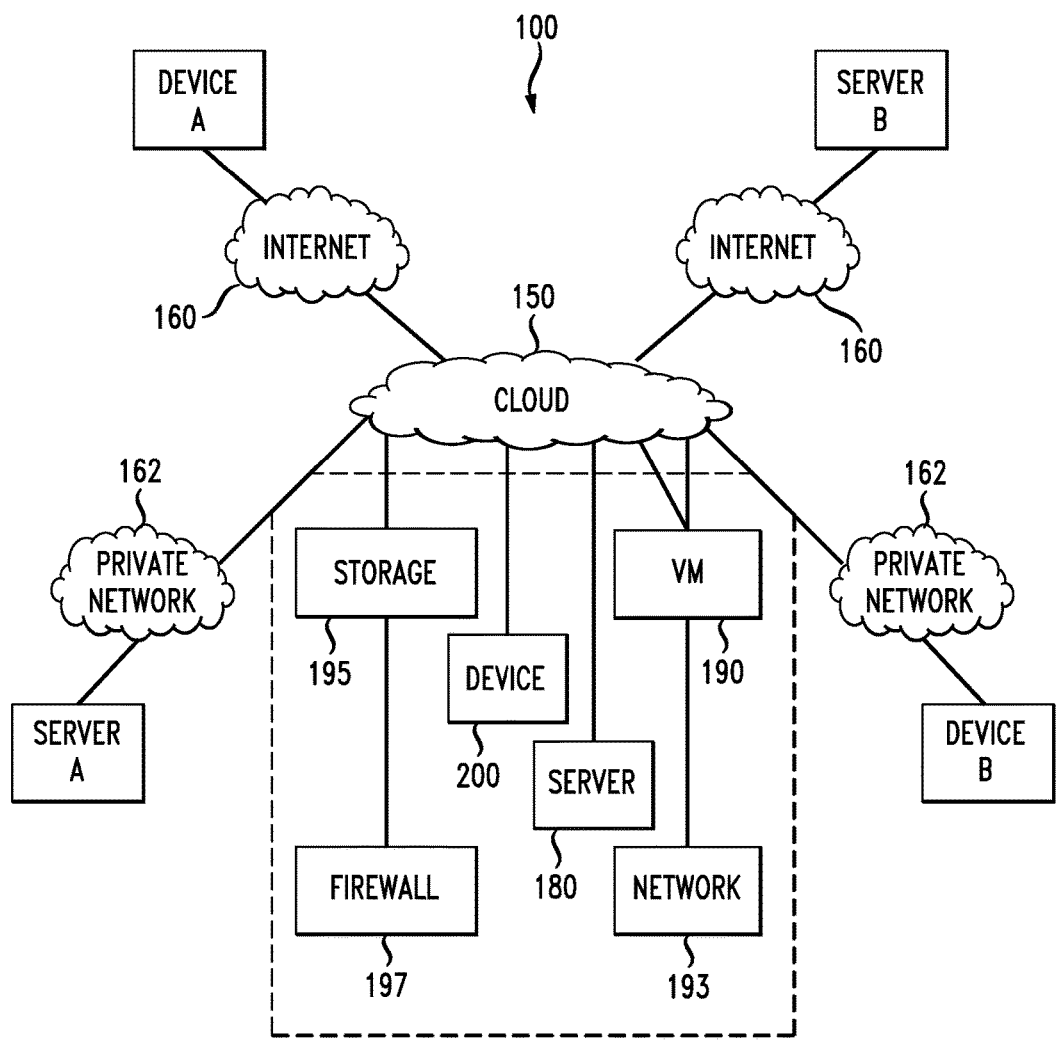
FIG. 1 is a schematic block diagram of an example computer network including nodes/devices interconnected by various methods of communication.

In one embodiment, a scheduler of a service can identify resource candidates for the service. Each of the resource candidates may be capable of hosting a logical resource of the service. The scheduler can then filter the resource candidates through a first filter chain, which may consist of serially connected filters. One or more of the filters can be a reference filter that may reference and trigger a second filter chain. Next, the scheduler can select from the filtered resource candidates a resource for hosting the logical resource.

2. Detailed Description

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

In light of the problems identified above with regards to the inter-service scheduling of logical resources, what is needed is a configurable scheduling workflow that supports collaborative scheduling across multiple services, preferably with a low degree of inter-service coupling. The subject technology addresses the foregoing need by using a filter scheduler with multiple filter chains in each of the IaaS services that are involved in instantiating a logical resource. A filter scheduler may utilize a series of filters in the form of a filter chain. The filter scheduler may also perform weighing to determine the best candidate(s) for hosting the resource. The scheduler may send a list of resource candidates (i.e., hosts) through the filter chain. The filters may accept or reject each of the candidates based on their respective filtering criteria. The optional weighing step can calculate and assign weights to the candidates that have passed through the filters. The scheduler selects the resource candidate with the highest weight to host the requested logical resource.

Moreover, the proposed method allows a filter chain in one IaaS service to contain a "reference filter" that can trigger the execution of another filter chain, possibly belonging in a different IaaS service. This approach allows for flexible filtering patterns where scheduling information and control from multiple services can be interleaved. Thus, joint, service-spanning scheduling can be performed with reasonable complexity and low inter-service coupling.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links.

The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Cloud computing can be generally defined as Internet-based computing in which computing resources are dynamically provisioned and allocated to client, user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), compute/processing devices (servers, CPU's, memory, brute force processing capability), storage devices (e.g., network attached storages, storage area network devices), etc., and may be used for instantiation of Virtual Machines (VM), databases, applications (Apps), etc.

Cloud computing resources may include a "private cloud," a "public cloud," and/or a "hybrid cloud." A "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way.

FIG. 1 is a schematic block diagram of an example computer network 100 illustratively including nodes/devices interconnected by various methods of communication. For instance, links may be wired links or shared media (e.g., wireless links, etc.) where certain nodes may be in communication with other nodes based on physical connection, or else based on distance, signal strength, current operational status, location, etc. Those skilled in the art will understand that any number of nodes, devices, links, etc. may be used in the computer network, and that the view shown herein is for simplicity.

Specifically, devices "A" and "B" may include any device with processing and/or storage capability, such as personal computers, mobile phones (e.g., smartphones), gaming systems, portable personal computers (e.g., laptops, tablets, etc.), set-top boxes, televisions, vehicles, etc., and may communicate with the network 160 (internet or private networks) to cloud 150. In addition, one or more servers (Server A and B), network management servers (NMSs), control centers, etc., may also be interconnected with (or located within) the network 160 to cloud 150.

Cloud 150 may be a public, private, and/or hybrid cloud system. Cloud 150 includes a plurality of resources such as firewalls 197, virtual networks 193, storage 195, devices 200, servers 180, and virtual machines (VMs) 190. The cloud resource may be a combination of physical and virtual resources. The cloud resources are provisioned based on requests from one or more clients. Clients may be one or more devices, for example device A and/or B, or one or more servers, for example server A and/or B.

Data packets (e.g., traffic and/or messages) may be exchanged among the nodes/devices of the computer network 100 using predefined network communication protocols such as certain known wired protocols, wireless protocols or other protocols where appropriate. In this context, a protocol consists of a set of rules defining how the nodes interact with each other.

Figure 2:
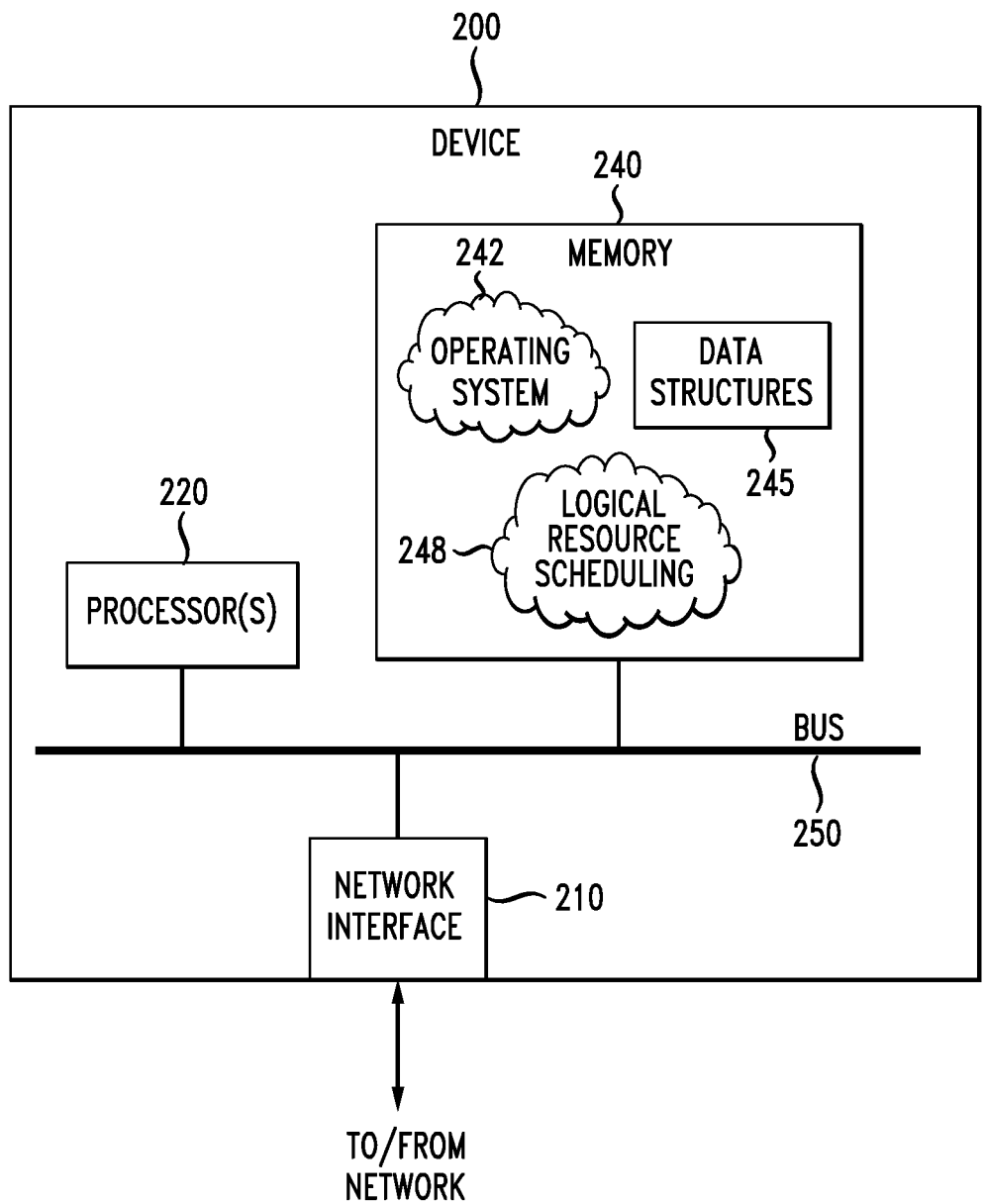
FIG. 2 is a schematic block diagram of an example simplified computing device.

FIG. 2 is a schematic block diagram of an example simplified computing device 200 that may be used with one or more embodiments described herein, e.g., as a server 180, or as a representation of one or more devices as VM 190. The illustrative "device" 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art. The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may include an illustrative logical resource scheduling process 248, as described herein.

It will be apparent to those skilled in the art that other processor and memory types, including various computer-readable media, may be used to store and execute program instructions pertaining to the techniques described herein. In addition, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process encoded thereon.

Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
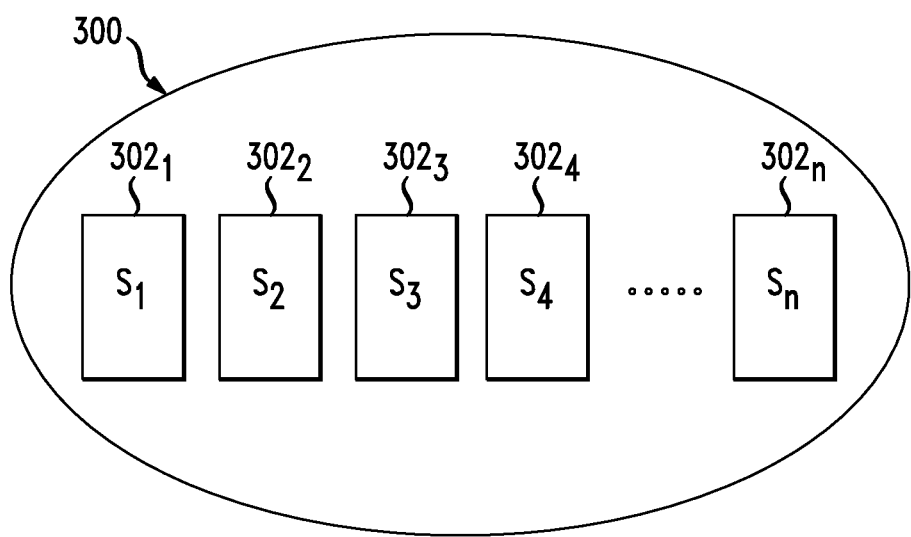
FIG. 3 is a schematic block diagram of an example IaaS cloud platform.

FIG. 3 is a schematic block diagram of an example IaaS cloud platform 300. IaaS cloud platform 300 can offer its customers computers and other resources, both physical and virtual. To that end, IaaS cloud platform 300 may maintain a pool of physical and/or virtual machines and resources. The resources offered by IaaS cloud platform 300 may include virtual machines, servers, a disk image library, storage, load balancers, firewalls, networks, Internet protocol (IP) addresses, virtual local area networks (VLANs), software solutions, etc. These services can be provided on-demand when the clients request them.

IaaS cloud platform 300 may consist of one or more IaaS services 302$_1$, 302$_2$, ..., 302$_n$ (collectively "302"). Each of the IaaS services 302 is capable of providing a service of one resource type or another. For example, IaaS service 302$_1$ may provide a virtual firewall service while IaaS service 302$_2$ may provide a load balancing service. Each of the IaaS services 302, in turn, may be a collection of servers, network devices, and other resources.

Although platform 300 is presented herein as an IaaS cloud platform, the various embodiments are not limited in this regard. For example, the various embodiments disclosed herein are also applicable to other cloud platforms such as platform as a service (PaaS) and software as a service (SaaS).

Figure 4:
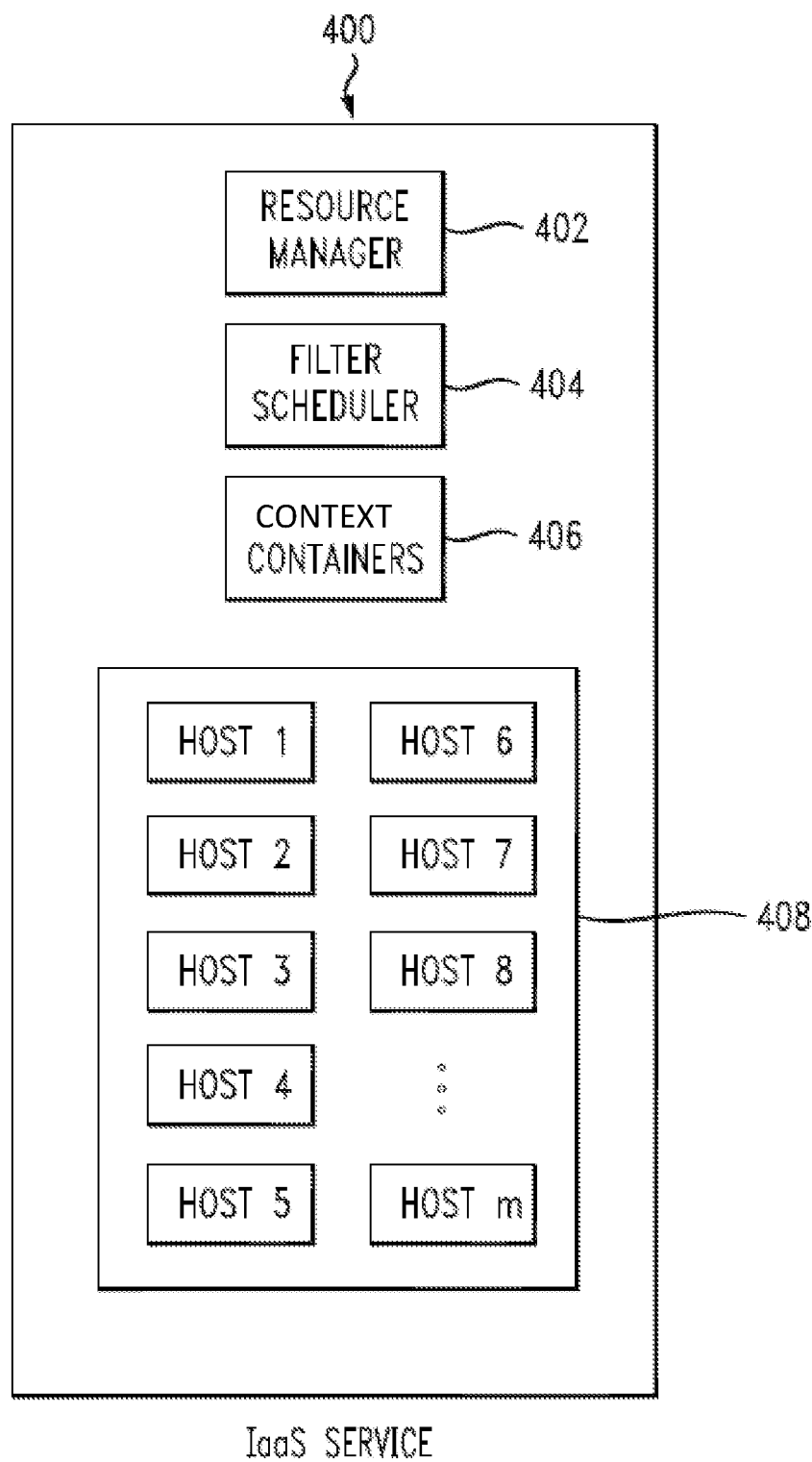
FIG. 4 is a schematic block diagram of an example IaaS service.

FIG. 4 is a schematic block diagram of an example IaaS service 400. Infrastructure service 400 can be one of the services that make up a larger cloud platform such as IaaS cloud platform 300. IaaS service 400 may offer one or more services such as a virtual machine, a server, a disk image library, storage, a load balancer, a firewall, a network, an IP address, a VLAN, and a software solution. IaaS service 400 can consist of one or more computing devices such as computing device 200 of FIG. 2. IaaS service 400 may also consist of one or more subcomponents such as resource manager 402, filter scheduler 404, context containers 406, and resource pool 408.

Although FIG. 4 shows four of the possible subcomponents that make up IaaS service 400, those of skill in the art will understand that other components may also be part of IaaS service 400. Those of skill in the art will also understand that some of the subcomponents can be combined into a single component. For example, one or more of resource manager 402, filter scheduler 404, context containers 406, and resource pool 408 can be combined into the same hardware and/or software modules. The various components can also exist in a distributed fashion across different infrastructure services or even different cloud platforms. For example, several different infrastructure services may have one central resource manager, filter scheduler, or context container that they may share. In another example, resource pool 408 can be shared among multiple infrastructure services that may be of differing service types. In such an embodiment, the resource hosts in the shared resource pool 408 can be provisioned to provide different services depending on which infrastructure service is using the resource pool.

Resource manager 400 performs a resource management function. The resource management function, along with a scheduler such as filter scheduler 404, enables the logical resources to be mapped to the underlying physical resources that host them. Specifically, resource manager 402 can instantiate or destroy logical resources according to the needs of the clients by provisioning, running, and/or modifying the host devices in resource pool 408. A scheduler such as filter scheduler 404 shown in FIG. 4 can select one or more host devices from resource pool 408 to host one or more logical resources. Filter scheduler 404 can also predict the needs of IaaS service 400 and schedule and reserve hosts to be consumed in the future. Filter scheduler 404 accomplishes these objectives by using one or more filters, which can be organized into serially connected groups of filters called filter chains.

In order to instantiate a logical resource, resource manager 402 and filter scheduler 404 may have to work in tandem with resource managers and schedulers of other infrastructure services. For example, instantiating a virtual firewall may also require an instantiation of a new virtual router. In such an instance, the scheduler for the firewall service may trigger the scheduler for the router so that the router can be fully or partially instantiated prior to the instantiation of the firewall.

Context container 406 can contain context information necessary to instantiate virtual resources. Context information can be data, metadata, data structures, databases, settings, preferences, history data, statuses, pointers, references, indexes, counters, etc. The context information may be stored in volatile memory such as random access memory (RAM) or in non-volatile memory such as a flash storage or magnetic storage device. The context container can be accessed by filter scheduler 404 and associated with filters and/or filter chains so that the scheduling function can preserve, update, modify, duplicate, and transfer context. Context container 406 may contain multiple instances of context data so that filters and/or filter chains may each have their own context.

Resource pool 408 is a collection of physical or logical resources that can host logical resources. The resources that are not currently hosting a service may be placed in a suspended state and presented as resource candidates until they are selected by scheduler 404 to host an instance of a service. The hosts inside resource pool 408 can be servers, virtual machines, terminals, network devices, etc. New hosts can be added to resource pool 408 or surplus hosts can be removed from resource pool 408 dynamically by resource manager 402 according to the current and future needs of IaaS service 400.

Figure 5:
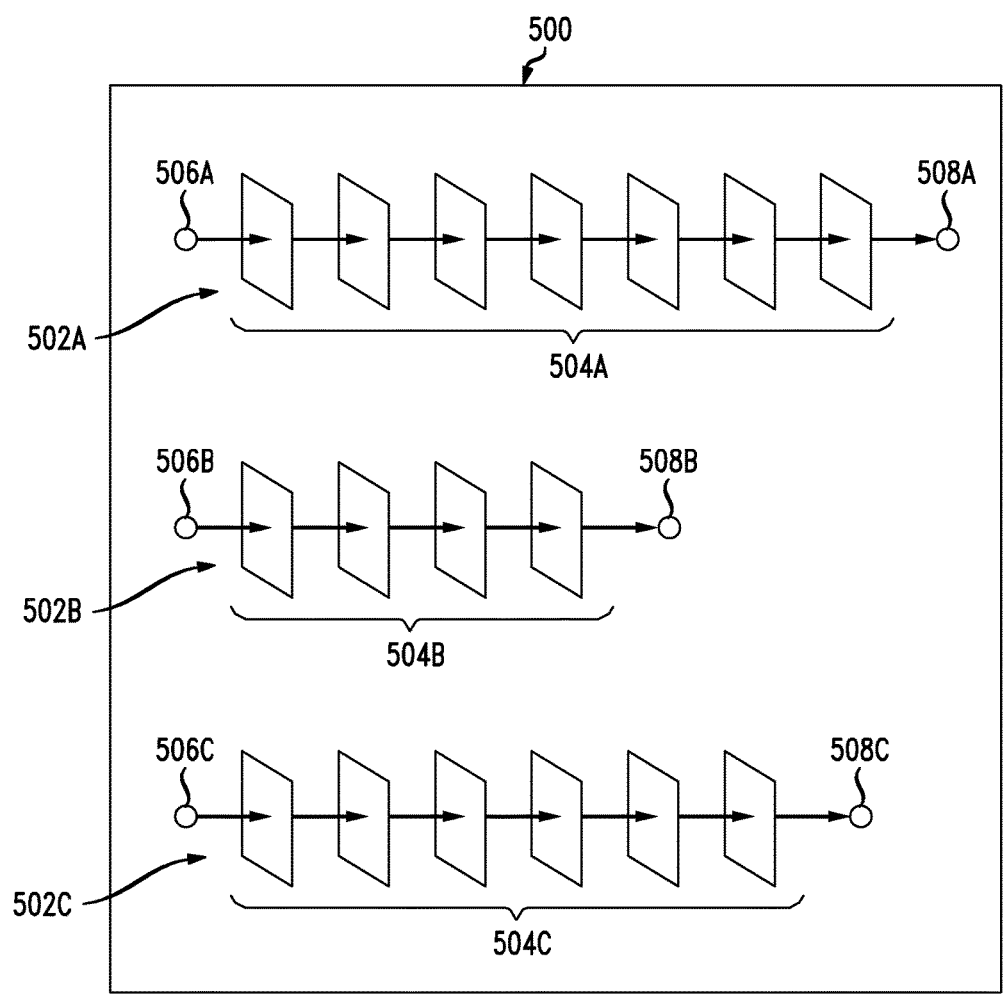
FIG. 5 illustrates example filter chains for a filter scheduler.

FIG. 5 illustrates example filter chains 502A-502C (collectively "502") for example filter scheduler 404 of FIG. 4. Filtering process 500 shown in FIG. 5 can be a logical rather than a physical representation of the structures and interrelationships of filter chains 502. An infrastructure service such as IaaS service 400 shown in FIG. 4 can have more than one filter chains such as filter chains 502. In some embodiments, a filter chain can be a linked list of multiple filter objects. A set of candidate resources 506A, which may be part of resource pool 408, can be put through a series of filters 504A in filter chain 502A. In some embodiments, the candidate resources can go through one filter of the filter chain at a time as a group. In other embodiments, each one of the candidate resources can go through the entirety of the filter chain before the next candidate resource traverses the chain. The resulting filtered set of resources 508A can be one or more resource candidates that are determined to be better or best suited to host the service according to the various requirements and criteria embodied in filters 504A. One or more filtered resource candidates 508A may be ordered based on suitability. Similarly, other filter chains 506B, 506C may filter other sets of resource candidates 506B, 506C to produce other filtered sets of resources 508B, 508C, respectively. One or more filter chains can be an entry-point filter chain, which is typically the first filter chain invoked to instantiate a resource. Other filter chains can be triggered or invoked while the entry-point filter chain is being executed. The entry-point filter chains can be determined by referencing a hash table that lists the types of resources with matching entry-point filter chains.

Each filter chain may consist of one or more filters 504A, 504B, 504C (collectively "504"). Filters 504 and filter chains 502 can be implemented as hardware or software modules. In some embodiments, filters 504 can be an algorithm with an accompanying data structure. Filters 504 can be a traditional filter, a reference filter, or a hybrid filter that is a mixture of a traditional filter and a reference filter. Traditional filters can accept or reject a resource candidate in resource pool 408 as a suitable host for a service. In other words, filters 504 can be a set of instructions or an algorithm that determines whether the candidates meet predetermined conditions, requirements, and/or thresholds. For example, traditional filters can accept or reject a candidate resource using various criteria, such as, computing capabilities, resource availability, utilization rate, bandwidth, resources, usage history, failure rate, available features, reservation schedule, dependency, storage capacity, resource pool availability, client specifications, etc. Each filter can be further customized to meet the needs of the clients. For example, a compute capability filter can be set up to screen out hosts whose computing capabilities are below a user-specified threshold.

On the other hand, one or more of filters 504 can be a reference filter that makes a reference to another filter scheduler, filter chain, or filter. Thus, with a reference filter, execution of filters can jump from one filter scheduler to another filter scheduler, from one filter chain to another filter chain, and/or from one filter to another filter. When a filter scheduler triggers another filter scheduler by means of a reference filter, the original filter scheduler may be suspended until control returns from the newly triggered scheduler.

Figure 6:
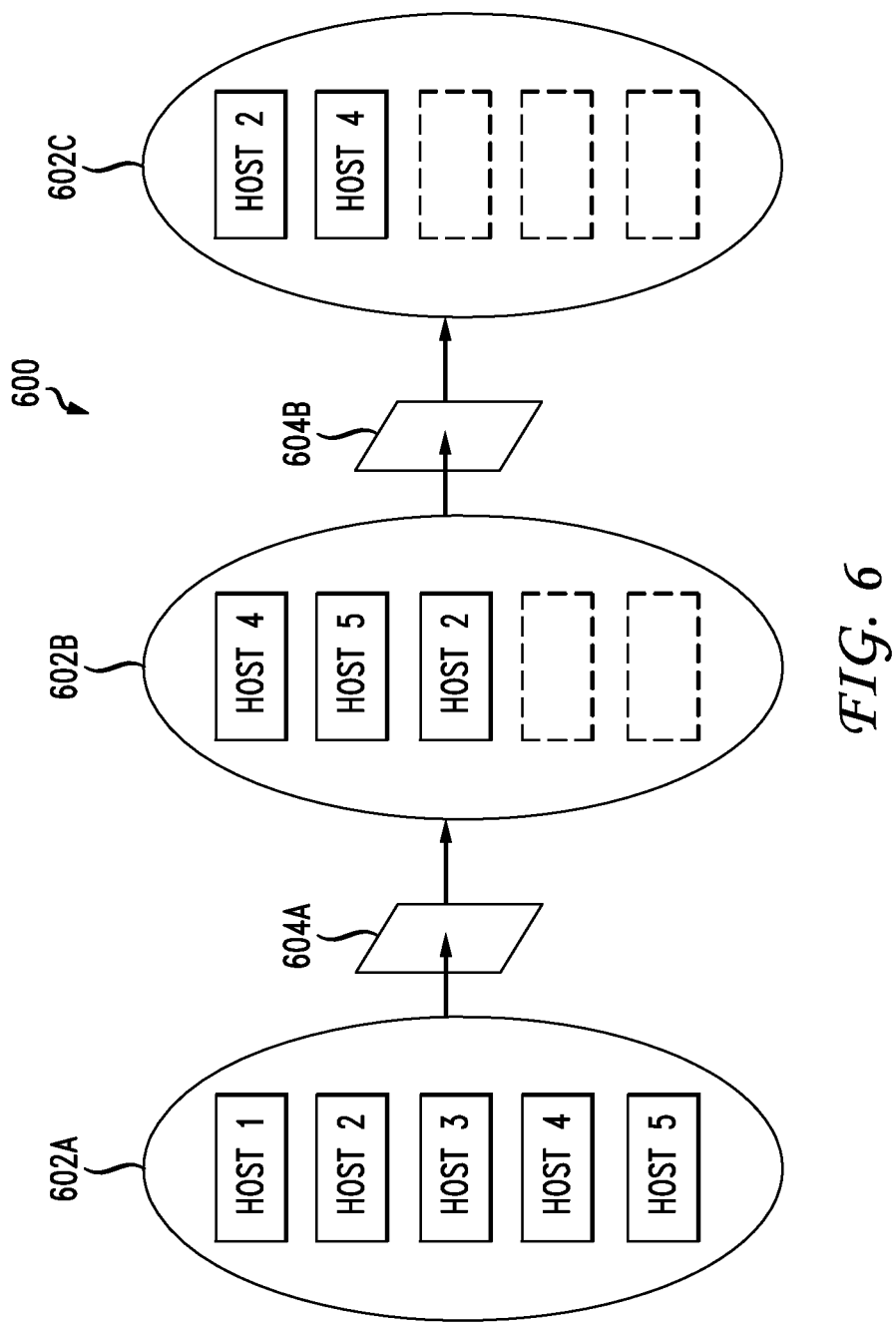
FIG. 6 illustrates an example resource candidate filtering process using a filter chain.

FIG. 6 illustrates an example resource candidate filtering process 600 using a filter chain. The example filter chain contains traditional filters 604A, 604B, which may accept or reject each of the host candidates that pass through the filters according to the conditions, criteria, and/or requirements that those filters each represent. For example, filter scheduler 404 may present a set of candidate hosts 602A to filter 604A. Running a host candidate through traditional filter 604A may involve applying the algorithm or instruction set associated with filter 604A to the candidate. Filter 604A, in this example, filters out two of the hosts (i.e., Host 1 and Host 3) from candidate set 602A as being unsuitable and outputs candidate set 602B consisting of the remaining hosts, Host 2, Host 4, and Host 5. Optionally, each host in candidate set 602B can be weighted and ordered according to the assigned weights. The weights can be assigned according to the criteria imbued in filter 604A.

Filter 604B, which is the next filter in line in this example filter chain, is then applied to the remaining hosts in candidate set 602B. Filter 604B may be of the same or different type of filter than filter 604A. For instance, filter 604A may be a compute capacity filter while filter 604B is an availability filter. Filter 604B may filter out additional hosts (e.g., Host 5) from candidate set 602B and output candidate set 602C consisting of host candidates that managed to pass through filter 604B. Optionally, the surviving candidates in candidate set 602C can be weighted once more and reordered according to the updated suitability scores. In some embodiments, weights can be assigned only once at the end of the filter chain rather than each time the candidates pass through a filter. Once the host candidates have passed through all the filters in the filter chain, filter scheduler 404 can select one or more hosts to be used to instantiate a logical resource. The selection can be based on the weighted scores given to the candidates. Alternatively, the selection can be made randomly or semi-randomly.

Figure 7:
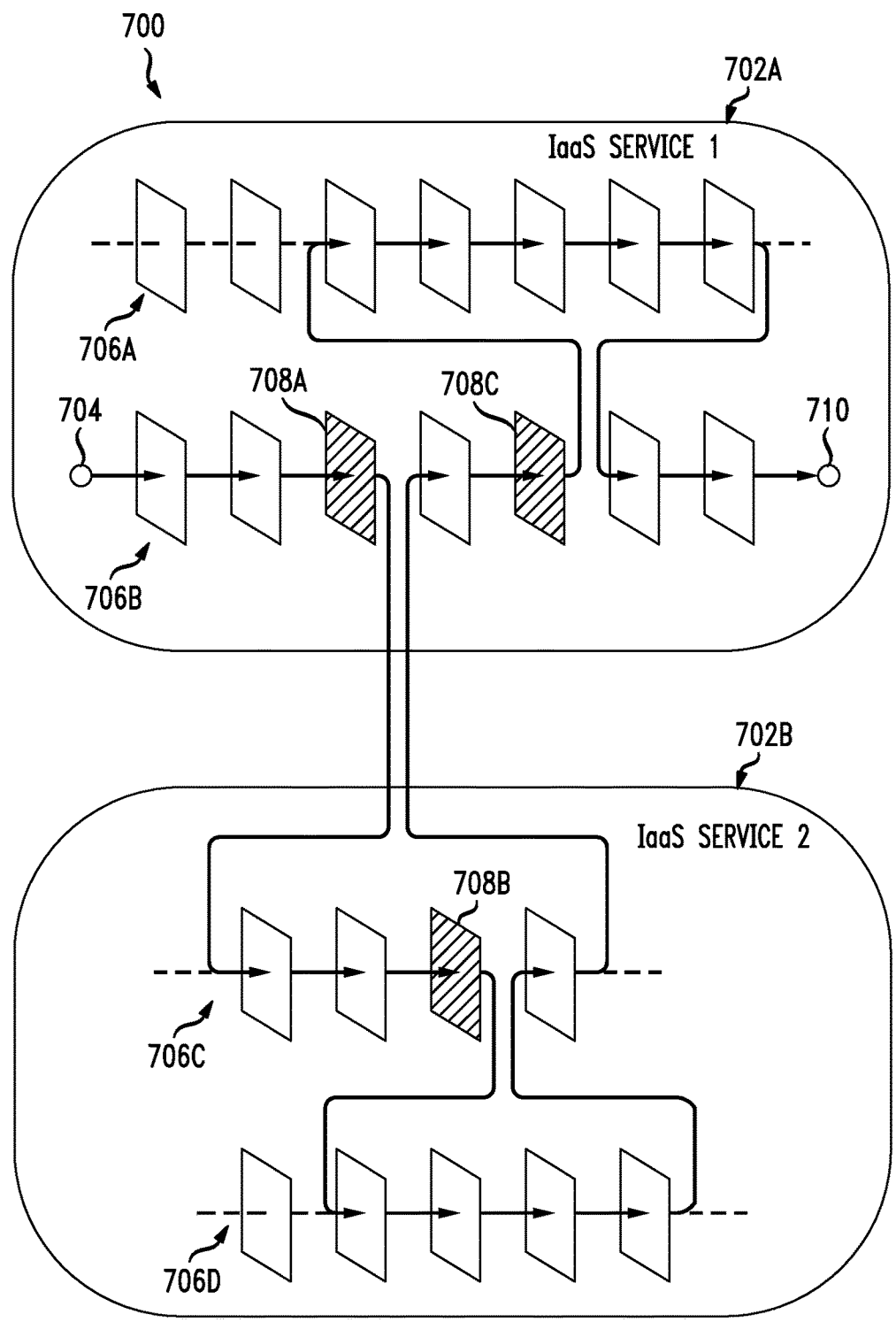
FIG. 7 illustrates example filter chains that contain reference filters.

FIG. 7 illustrates an example filtering process 700 that involves filter chains 706A, 706B, 706C, 706D (collectively "706") that contain one or more reference filters 708A, 708B, 708C (collectively "708"). Reference filters 708A, 708B, 708C (collectively "708") may make reference to other filter chains, either within or beyond the infrastructure service that they belong to. Reference filters 708 may contain such reference information as a target service, a target scheduler, a target filter chain, and/or a filter chain index. In this example, filter scheduler 702A for IaaS Service 1 is tasked with instantiating a resource of service type 1. Filter scheduler 702A identifies entry-point filter chain 706B for service type 1. Filter chain 706B contains several traditional filters as well as a couple of reference filters 708A, 708C. Reference filter 708A makes a reference to the first filter in filter chain 706C of infrastructure service 702B. On the other hand, reference filter 708C makes a reference to the third filter in filter chain 706A belonging to service 702A. In order to select the right candidate to host the logical resource, scheduler 702A may run a group of resource candidates 704 through one or more filter chains 706.

Scheduler 702A may start with entry-point filter chain 706B and run the host candidates through the filters in filter chain 706B. The candidates can pass through the entirety of the filters one candidate at a time or they can also pass through the filters as a group, one filter at a time. Either way, when a resource candidate reaches reference filter 708A, which references another filter chain 706C belonging in another infrastructure service, filter scheduler 702A can suspend the execution of filter chain 706B before triggering filter scheduler 702B and/or filter chain 706C. Filter scheduler 702B can continue the filtering process by invoking the referenced filter in filter chain 706C. In this example, filtering chain 706C includes a reference filter 708B, which references the second filter in filter chain 706D of IaaS service 2.

The host candidate may successfully pass through some of the traditional filters in filter chain 706C before encountering reference filter 708B, at which point control is shifted to yet another filter chain 706D. The execution of filter chain 706C may be suspended until control returns from filter chain 706D. If the resource candidate successfully passes through all the filters in filter chain 706D, filter scheduler 702B resumes execution of 706C where it left off earlier. After processing the remaining filters in 702B, control finally returns to filter chain 706B until the resource candidate encounters yet another reference filter 708C, which references filter chain 706A of IaaS service 1. Filter scheduler 702A identifies the appropriate filter index and begins execution of the filters in filter chain 706A. Once control returns to filter chain 706B, the remaining filters are processed and any resource candidates that managed to successfully pass through all of the filters in the filter chain are presented as acceptable candidates 710, from which filter scheduler 702A can finally select one or more hosts for the logical resource.

Optionally, any resource candidates that pass through one or more filters can be weighted and assigned scores that indicate suitability for hosting a logical resource. The weighting can be done in between filters or at the end of the filter chain. The criteria that are used for weighting can be similar to those used by the filters. Different weighting criteria can have varying degrees of multipliers so that each criterion can be prioritized. In other words, a higher-value multiplier can be used to assign scores for a higher-priority criterion.

Filter schedulers 702 may also use context containers to preserve context when switching from one filter chain to another. The context containers can contain context information needed to schedule a resource. Various filters and filter chains 706 may add new information to the context containers, modify the information in the context containers, or delete information from the context containers. Thus, a context container, in effect, can function as a communication mechanism between filters and/or filter chains. As an example, entry-point filter chain 706B can be associated with context container CC. Context container CC, for instance, may contain information about the resource candidate set that is passing through filter chain 706B.

Moreover, when handing control over to filter chain 706C, however, filter scheduler 702A can create a duplicate context container CC' based on CC and hand it over to filter scheduler 702B or filter chain 706C. Filter scheduler 702A can also update duplicate context container CC' with reference information so that scheduler 702B can properly return control back to scheduler 702A. When control does return to scheduler 702A, some of the information contained in CC' that is specific to scheduler 702B can be adapted and copied to CC. By the same token, when filter chain 706C triggers filter chain 706D, e.g., by way of reference filter 708B, scheduler 702B can spawn yet another child context container CC" based on CC'. Duplicate context container CC" can contain necessary information to process the appropriate set of host candidates through filter chain 706D and return control back to filter chain 706C. Filter chain 706D may modify some data contained in CC" over the course of its filtering process and some of that data can be adapted and copied back to the parent context container CC'. Similarly, still yet another duplicate context container CC''' can be generated for filter chain 706A.

Having disclosed some basic system components and concepts, the disclosure now turns to some exemplary method embodiments shown in FIGS. 8-11. For the sake of clarity, the methods are discussed in terms of an example system 100, as shown in FIG. 1, configured to practice the methods. It is understood that the steps outlined herein are provided for the purpose of illustrating certain embodiments of the subject technology, but that other combinations thereof, including combinations that exclude, add, or modify certain steps, may be used.

Figure 8A:
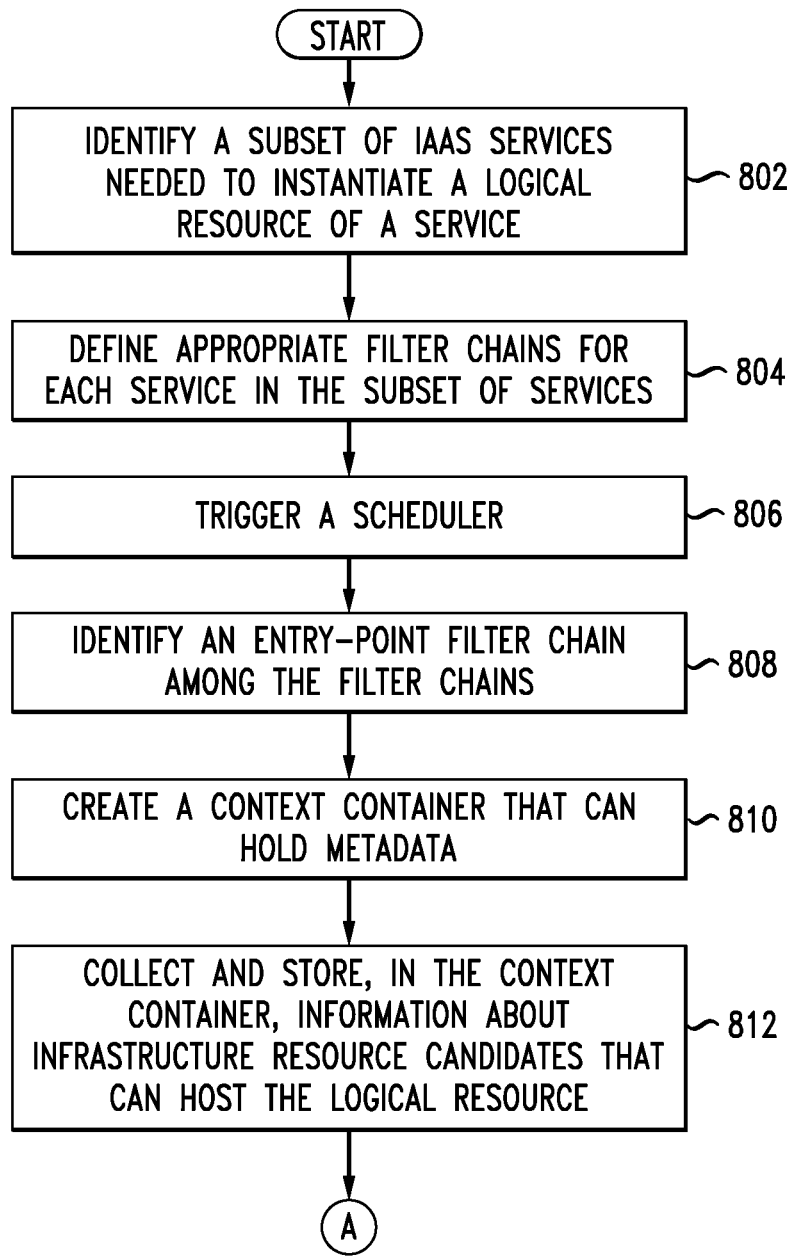
FIGS. 8A-8B illustrate an example method for scheduling a service.
Figure 8B:
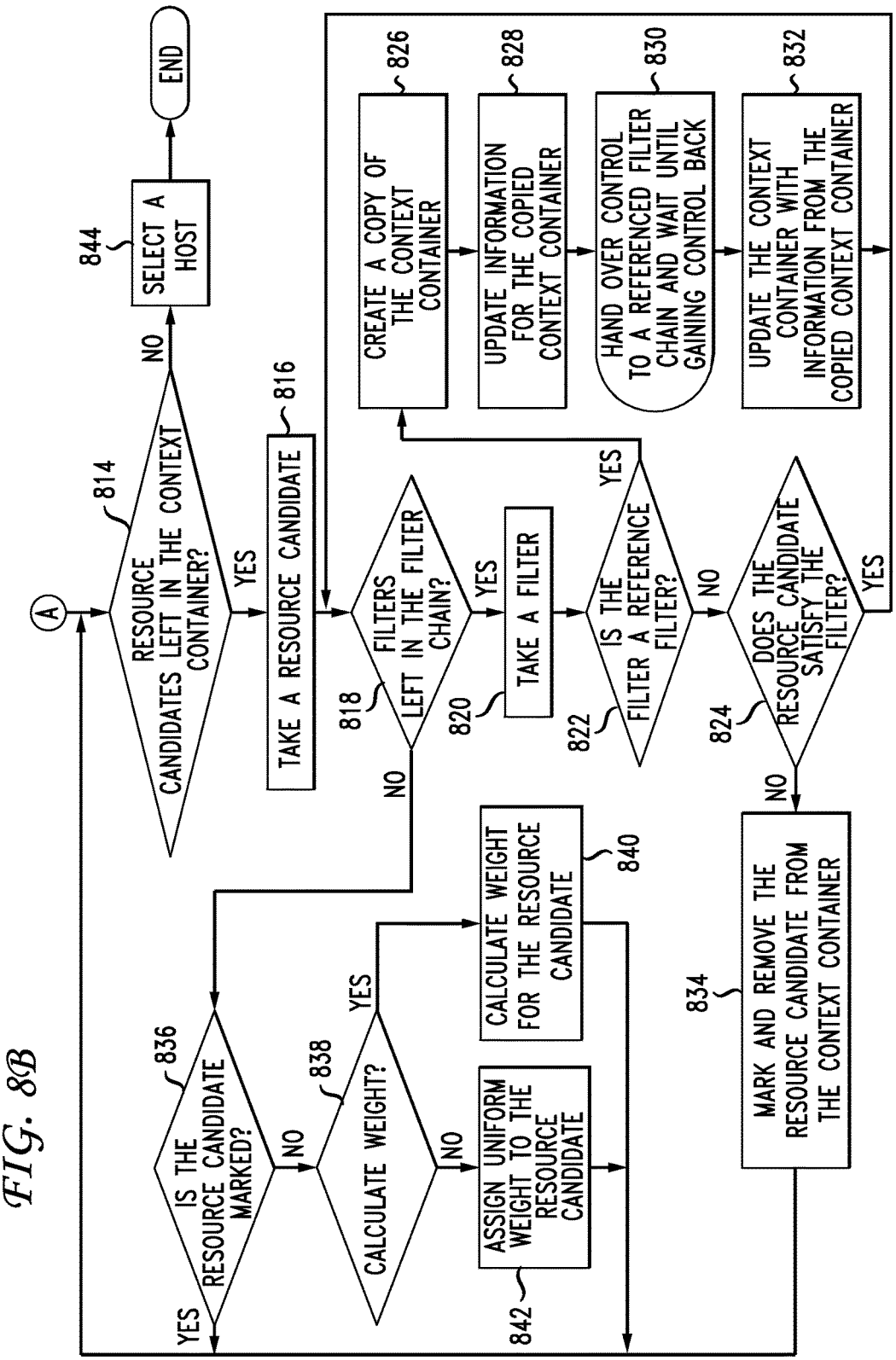

FIGS. 8A-8B illustrate an example method embodiment. In FIG. 8A, system 100 can identify a subset of IaaS services needed to instantiate a logical resource of a service (802). For example, an IaaS cloud platform may have n IaaS services $S_1, S_2, \ldots, S_n$ that use filter schedulers supporting multiple filter chains. To instantiate a logical resource X of service $S_X$, it may be desirable, for efficiency, performance, feasibility, etc., to involve a subset $\{S_i\}k$, with k of the n services, in the scheduling task. Next, system 100 can define appropriate filter chains for each service in the subset of services (804). This can be performed during maintenance of the IaaS cloud platform. For example, for each service in $\{S_i\}k \cup \{S_X\}$, $m_i$ filter chains, $C_i\_X_j$, where j=1, ..., $m_i$ and $m_i \geq 1$, appropriate for X can be defined and created. A filter chain can be an arbitrary, but finitely long, ordered sequence of filters F. The filters can be either traditional filters $F_T$ that accept or reject candidates or reference filters $F_R$. The reference filters may point to another scheduler $S\_S_Y$, a filter chain $C_Y\_X_j$, and index l into that chain, where $S_Y$ is another service in $\{S_i\}k \cup \{S_X\}$. Hence, the reference filter can be symbolized as $F_R=\text{Ref}(S\_S_Y, C_Y\_X_j, l)$ and the filter chain can be written as $C_i\_X_j: F_a \rightarrow F_b \rightarrow \ldots \rightarrow F_q$, where F can be either an $F_T$ or an $F_R$. One of the filter chains in $S_X$, $C_{Start}X=C_X\_X_j$, can be the entry-point in the scheduling of an X instance.

The creator of the chains or the IaaS platform may need to ensure that there are no "infinite loops" in the filter chains. For example, if one filter chain contains a reference filter that references another filter chain, and the second filter chain contains a reference filter that references the original filter chain, it is possible that execution of one of the filter chains would result in a never-ending cycle, switching back and forth between the two filter chains.

System 100 can then trigger a scheduler (806). In other words, invocation of the scheduler may be triggered as part of creating an X logical resource. System 100 can then identify an entry-point filter chain among the filter chains (808). For example, the entry-point chain $C_{Start}X$ for X may be determined by the IaaS platform. The determination of the entry-point chain can be accomplished by performing a lookup in a hash table.

System 100 may create a context container that can hold metadata (810). For example, a context container CC can be created so that it can hold context information for instance X needed during scheduling and application of filters. This can include information about other logical resource instances, both currently existing and not yet instantiated. Filters can add information to CC. The context container can thereby effectively act as a communication mechanism between different filters in the chains. System 100 may then collect and store, in the context container, information about infrastructure resource candidates that can potentially host the logical resource (812). For example, the information about infrastructure resource candidates that can possibly host X can be collected and stored as a set {RC} in CC.

In FIG. 8B, system 100 may go through each resource candidate in the context container by determining whether there are any resource candidates left in the context container (814). If there are one or more resource candidates to evaluate in the container, then system 100 may take one of the resource candidates (816) and run it through the filters in the filter chain. For example, system 100 can identify a resource candidate R in CC:{RC}. Execution of the filters can be accomplished by determining whether there are any filters left to process in the filter chain (818) and taking a filter in the filter chain (820). For example, system 100 may start out with the entry filter chain $C_{Start}X$. Then, system 100 may determine whether the current filter is a traditional filter or a reference filter (822). If the filter turns out to be a traditional filter, then system 100 determines whether the resource candidate satisfies that filter (824). If the resource candidate satisfies the filter, then system 100 proceeds to the next filter in the filter chain and processes the next filter (818). However, if the resource candidate fails to satisfy the traditional filter, then system 100 can mark and remove the resource candidate from the context container (834). For example, resource candidate R may be marked and removed from CC:{RC}. Since the resource candidate has already failed one of the filters in the filter chain, there is no need to process the remaining filters in the chain in this case. Thus, system 100 may continue to see if there are any other resource candidates to evaluate (814) and pick another resource candidate (816) to run through the filter chain(s).

If, on the other hand, the filter being executed is a reference filter, then system 100 can create a copy of the context container (826). For example, a copy CC' of CC can be created. When doing so, some information in CC can be removed or modified in CC' to suit the need of the filter chain being triggered. Additionally, the new resource candidate set for CC' may be set to consist solely of the current resource candidate R being evaluated. In other words, CC': {RC} may be set to be equal to {R}. Next, system 100 may update information for the copied context container (828). Thus, for example, CC' can be updated with necessary information to help the scheduler in another service properly return control to the current scheduler. Additionally, $F_R$ can add filter-specific data to CC and/or CC'. Then, system 100 can hand over control to the referenced filter chain and wait until gaining back control (830). For example, control can be handed over to Ref(S_$S_Y$, $C_Y\_X_j$, 1), and CC' object or its reference pointer can be sent along to the referenced scheduler or filter chain. In some embodiments, control can be handed over to other scheduler(s) by way of message queue-based remote procedure call (RPC). While filter chain $C_Y\_X_j$ is being executed by S_$S_Y$, the current filter chain F can be suspended. When control finally returns, the current filter chain or the scheduler may also receive context container CC", which is a modified version of C' by S_$S_Y$ and any other services to remove any service-specific (and thus irrelevant to the original scheduler) data from CC'. System 100 may update the context container with information from the copied context container (832). For example, $F_R$ can adapt and copy filter-specific data (in particular the filtered resource candidate set {RC}) from CC" to CC. System 100 then continues the filtering process with any remaining filters (818).

Once the filters in the given filter chain is exhausted (818), system 100 determines whether the resource candidate is marked (836). In other words, it is determined whether the resource candidate successfully passed through all of the filters in the filter chain(s). If the resource candidate is marked (i.e., failed one of the filters), then system 100 moves on to process any other remaining resource candidates in the context container (814). If, on the other hand, the resource candidate is not marked, then system 100 can optionally assign a weight to the validated resource candidate. The weight can be a suitability score that indicates how suitable or desirable the particular resource candidate is for hosting the logical resource. Thus, if a flag condition indicates that a weight is to be calculated (838), system 100 may calculate the weight for the resource candidate (840). For example, the weight can be calculated with a weight function (e.g., w[R]=weight_function(R)). Alternatively, system 100 may assign a uniform weight to the resource candidate (842). For example, system 100 can assign the same score to every resource candidate (e.g., w[R]=1). Once the calculated weight or uniform weight is assigned to the resource candidate, system 100 may move on to process other resources candidates left in the context container (814). In some embodiments, the weighting steps can be performed after each filter instead of being performed only once at the end of the entire filter chain.

When all the resource candidates are processed and the candidate set is exhausted in the context container, system 100 can finally select a host (844). In some embodiments, system 100 can select multiple hosts for multiple logical resources. The selection of the host(s) can be based on the weights that are assigned to the candidate resources. For example, the resource candidate with the highest suitability score can be selected as the host. If there are more than one candidate with the same or similar score, then the host may be selected randomly.

Figure 9:
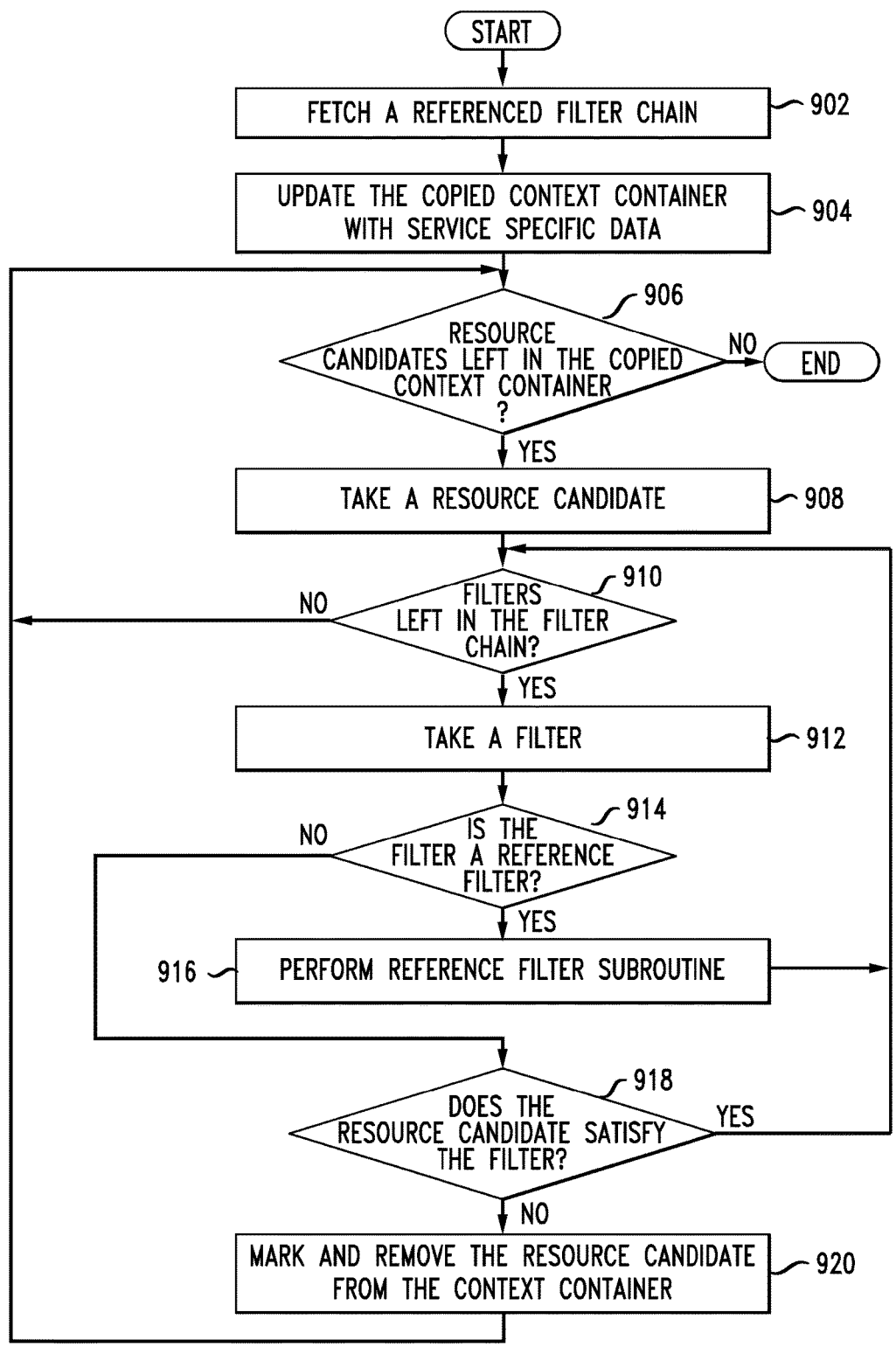
FIG. 9 illustrates another example method for scheduling a service.

FIG. 9 illustrates another example method embodiment for scheduling a service. Specifically, the method embodiment shown in FIG. 9 may pick up from step 830 of FIG. 8B, where the original scheduler hands over control to a referenced filter chain. The referenced filter chain may be associated with an infrastructure service that is different from the one that the original scheduler belongs to. The method embodiment for the referenced filter chain largely mirrors that of the original filter chain. The key difference is the handling of the context containers because the referenced filter chain may have a separate but related context container that is copied from the original context container.

System 100, which can be a referenced filter scheduler, may gain control handed over from the original scheduler and fetch a referenced filter chain (902). For example, the referenced scheduler can retrieve information about filter chain $C_Y\_X_j$, which was referenced in the context container. System 100 can then update the copied context container with service-specific data (904). For example, system 100 can update context container CC', which is a copy of the original context container CC, with data that are specific to the referenced infrastructure service. Next, system 100 may determine whether there are any resource candidates left in the copied context container (906). For example, system 100 can peek into CC' {RC} and see if there are any resources, such as resource candidate R, left in the context container. If system 100 is processing one resource candidate at a time through the entire filter chain, then there may be only one resource candidate in the copied context container. Alternatively, if more than one resource candidates are being filtered, then there could be more than one resource candidates in the copied context container.

If there is at least one resource candidate to process in the copied context container, then System 100 may take a resource candidate (908), and run the resource candidate through the filters in the filter chain by determining whether there are filters left in the filter chain (910), and taking one of the filters (912). For example, system 100 may start from the filter with index 1, as specified in the context container. If system 100 determines that the filter is a reference filter (914), then it can perform a reference filter subroutine (916) that is similar to steps 826-832 in FIG. 8B. In particular, via one or more reference filters, the referenced filter chain may trigger yet other filter chains inside or outside the infrastructure service to create multi-layered filter chains.

If the filter is a traditional filter, on the other hand, then system 100 may determine whether the resource candidate satisfies the filter (918), and mark and remove the resource candidate from the context container (920) if the candidate fails the filter. Once all the filters have been processed and there is no other filters left to process in the filter chain (910), system 100 may assign weights to the resource candidate(s) according to the steps similar to steps 836-842 of FIG. 8B. Throughout the filtering process of steps 902-920, system 100 may update and/or modify the copied context container CC' or generate a new context container CC" based on other context containers. Once all the resources have been filtered through the filter chain (906), system 100 may return control to the original filter scheduler that triggered the referenced filter scheduler.

FIGS. 10A-10B illustrate example pseudocode for scheduling a service. The pseudocode shown in FIG. 10A and FIG. 10B may correspond with the steps illustrated in the method embodiments of FIG. 8B and FIG. 9, respectively. Those of skill in the art will understand that other implementations of the method embodiments are also possible. For example, the pseudocode shown in FIGS. 10A-10B can be modified so that the order in which the two for loops are layered can be reversed. In other words, the for loop of line 1 in FIG. 10A can be placed inside the for loop of line 2 so that system 100 can filter all the resource candidates through the filter chain(s) together, one filter at a time, instead of processing one resource candidate at a time through the entire filter chain(s). In other variations, the weighting routine of lines 15-19 may be placed inside the for loop of line 2 and the effects of the weighting be made cumulative so that the weighting can be performed at every filter instead of only once after processing the entire filter chain.

Figure 11:
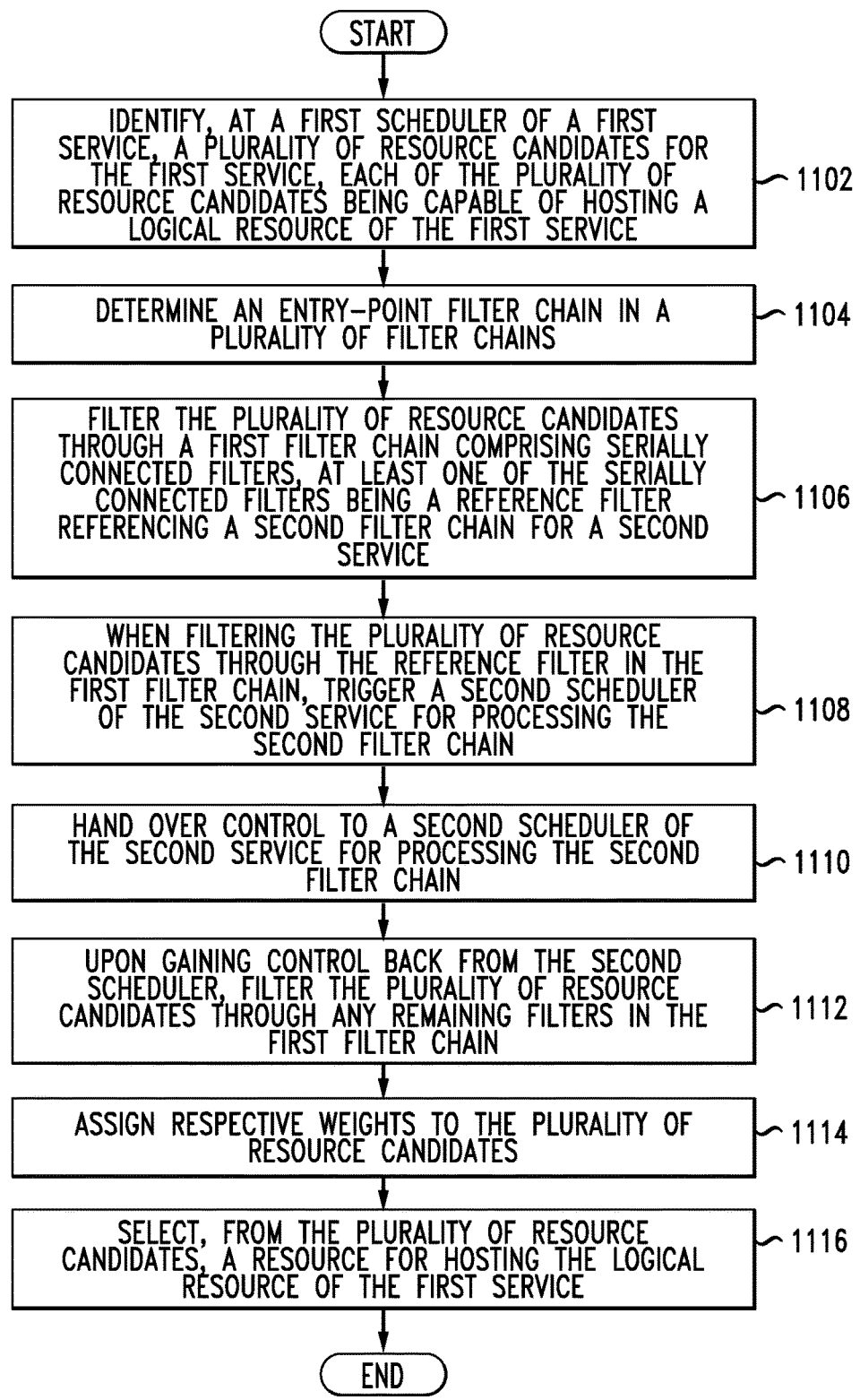
FIG. 11 illustrates yet another example method for scheduling a service.

FIG. 11 illustrates yet another example method embodiment for scheduling a service. System 100 may identify, at a first scheduler of a first service, a plurality of resource candidates for the first service, each of the plurality of resource candidates being capable of hosting a logical resource of the first service (1102). System 100 may also determine an entry-point filter chain from a plurality of filter chains (1104). Then, system 100 may filter the plurality of resource candidates through a first filter chain comprising serially connected filters, at least one of the serially connected filters being a reference filter referencing a second filter chain for a second service (1106). For example, the first filter chain can be the entry-point filter chain for the first service. When filtering the plurality of resource candidates through the reference filter in the first filter chain, system 100 may trigger a second scheduler of the second service for processing the second filter chain (1108). System 100 may then hand over control to the second scheduler of the second service for processing the second filter chain (1110). The first scheduler at this time may be suspended until control returns to it. Upon gaining control back from the second scheduler, the first scheduler may filter the plurality of resource candidates through any remaining filters in the first filter chain (1112). Optionally, system 100 can assign respective weights to the plurality of resource candidates (1114). These weights can represent suitability scores for hosting the logical resource. System 100 can then select, from the plurality of resource candidates, a resource for hosting the logical resource of the first service (1116). The selected resource can be a physical resource that is capable of hosting the logical resource. The selection can be based any of the weights that have been assigned to one or more resource candidates.

It should be understood that the steps shown above are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for improving user experience, simplifying application service design using cloud services, and more predictably establishing a virtual resource instantiation time.

While there have been shown and described illustrative embodiments that provide for scheduling a logical resource, it is to be understood that various other adaptations and modifications may be made within the spirit and scope of the embodiments herein. For example, the embodiments have been shown and described herein with relation to cloud networks. However, the embodiments in their broader sense are not as limited, and, in fact, may be used with other types of shared networks. Moreover, even though some of the embodiments have been shown and described herein with relation to infrastructure services, resources may be scheduled according to the various methods described herein in other types of services such as platform services and software services.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for filtering at least one resource candidate through a system that includes a first set of sequential filters and a second set of sequential filters different from the first set, a first filter in the first set of sequential filters including a reference to a second filter in the second set of sequential filters, the method comprising:
    first sequentially filtering a received resource candidate through at least a portion of the first set of sequential filters;
    in response to the first sequential filtering reaching the first filter of the first set of sequential filters:
        suspending the first sequential filtering; and
        second sequentially filtering, by the second set of sequential filters beginning with the second filter, an output of the first filter;
    first receiving, at a sequentially next filter to the first filter in the first set of sequential filters, a further filtered version of the output of the first filter, the further filtered version being at least partially filtered by at least a portion of the second set of sequential filters;
    resuming, in response to the first receiving, the first sequential filtering beginning with the sequential next filter to the first filter of the first set of sequential filters.

2. The method of claim 1, wherein the receiving is in response to completion of the second sequentially filtering.

3. The method of claim 1, the system further includes a third set of sequential filters different from the first and second sets, a third filter in the second set of sequential filters including a reference to a fourth filter in the third set of sequential filters, the third filter being downstream from the second filter in the second set of sequential filters, the method further comprising:
    in response to the second sequential filtering reaching the third filter of the second set of sequential filters:
        suspending the second sequential filtering;
        third sequentially filtering, by the third set of filters beginning with the fourth filter, an output of the third filter.

4. The method of claim 3, the method further comprising:
    second receiving at a sequentially next filter to the third filter in the second set of sequential filters, a further filtered version of the output of the third filter, the further filtered version being at least partially filtered by at least a portion of the third set of sequential filters;
    resuming, in response to the second receiving, the second sequential filtering beginning with the sequential next filter to the third filter of the second set of sequential filters.

5. The method of claim 1, wherein the second receiving is in response to completion of the third sequentially filtering.

6. The method of claim 1, wherein between the suspending the second sequential filtering and the resuming the second sequential filtering, the resource candidate is filtered by at least a portion of at least one other set of sequential filters different from the first, second and third sets of sequential filters.

7. The method of claim 1, further comprising completing the first sequential filtering.

8. A non-transitory computer readable medium containing instructions to filter at least one resource candidate through a system that includes a first set of sequential filters and a second set of sequential filters different from the first set, a first filter in the first set of sequential filters including a reference to a second filter in the second set of sequential filters, the instructions being programmed to cause a processor to perform operations, comprising:
    first sequentially filtering a received resource candidate through at least a portion of the first set of sequential filters;
    in response to the first sequential filtering reaching the first filter of the first set of sequential filters:
        suspending the first sequential filtering; and
        second sequentially filtering, by the second set of sequential filters beginning with the second filter, an output of the first filter;
    first receiving, at a sequentially next filter to the first filter in the first set of sequential filters, a further filtered version of the output of the first filter, the further filtered version being at least partially filtered by at least a portion of the second set of sequential filters;
    resuming, in response to the first receiving, the first sequential filtering beginning with the sequential next filter to the first filter of the first set of sequential filters.

9. The media of claim 8, wherein the receiving is in response to completion of the second sequentially filtering.

10. The media of claim 8, the system further includes a third set of sequential filters different from the first and second sets, a third filter in the second set of sequential filters including a reference to a fourth filter in the third set of sequential filters, the third filter being downstream from the second filter in the second set of sequential filters, the method further comprising:
    in response to the second sequential filtering reaching the third filter of the second set of sequential filters:
        suspending the second sequential filtering;

third sequentially filtering, by the third set of filters beginning with the fourth filter, an output of the third filter.

11. The media of claim 10, the operations further comprising:
second receiving at a sequentially next filter to the third filter in the second set of sequential filters, a further filtered version of the output of the third filter, the further filtered version being at least partially filtered by at least a portion of the third set of sequential filters;
resuming, in response to the second receiving, the second sequential filtering beginning with the sequential next filter to the third filter of the second set of sequential filters.

12. The media of claim 8, wherein the second receiving is in response to completion of the third sequentially filtering.

13. The media of claim 8, wherein between the suspending the second sequential filtering and the resuming the second sequential filtering, the resource candidate is filtered by at least a portion of at least one other set of sequential filters different from the first, second and third sets of sequential filters.

14. The media of claim 8, further comprising completing the first sequential filtering.

15. A system for filtering at least one resource candidate, the system including a first set of sequential filters and a second set of sequential filters different from the first set, a first filter in the first set of sequential filters including a reference to a second filter in the second set of sequential filters, the system comprising:
a memory;
a processor configured to cooperate with the memory and perform operations comprising:
first sequentially filtering a received resource candidate through at least a portion of the first set of sequential filters;
in response to the first sequential filtering reaching the first filter of the first set of sequential filters:
suspending the first sequential filtering; and
second sequentially filtering, by the second set of sequential filters beginning with the second filter, an output of the first filter;
first receiving, at a sequentially next filter to the first filter in the first set of sequential filters, a further filtered version of the output of the first filter, the further filtered version being at least partially filtered by at least a portion of the second set of sequential filters;
resuming, in response to the first receiving, the first sequential filtering beginning with the sequential next filter to the first filter of the first set of sequential filters.

16. The system of claim 15, wherein the receiving is in response to completion of the second sequentially filtering.

17. The system of claim 15, the system further includes a third set of sequential filters different from the first and second sets, a third filter in the second set of sequential filters including a reference to a fourth filter in the third set of sequential filters, the third filter being downstream from the second filter in the second set of sequential filters, the operations further comprising:
in response to the second sequential filtering reaching the third filter of the second set of sequential filters:
suspending the second sequential filtering;
third sequentially filtering, by the third set of filters beginning with the fourth filter, an output of the third filter.

18. The system of claim 17, the operations further comprising:
second receiving at a sequentially next filter to the third filter in the second set of sequential filters, a further filtered version of the output of the third filter, the further filtered version being at least partially filtered by at least a portion of the third set of sequential filters;
resuming, in response to the second receiving, the second sequential filtering beginning with the sequential next filter to the third filter of the second set of sequential filters.

19. The system of claim 15, wherein the second receiving is in response to completion of the third sequentially filtering.

20. The system of claim 15, wherein between the suspending the second sequential filtering and the resuming the second sequential filtering, the resource candidate is filtered by at least a portion of at least one other set of sequential filters different from the first, second and third sets of sequential filters.

* * * * *